Figure 1:
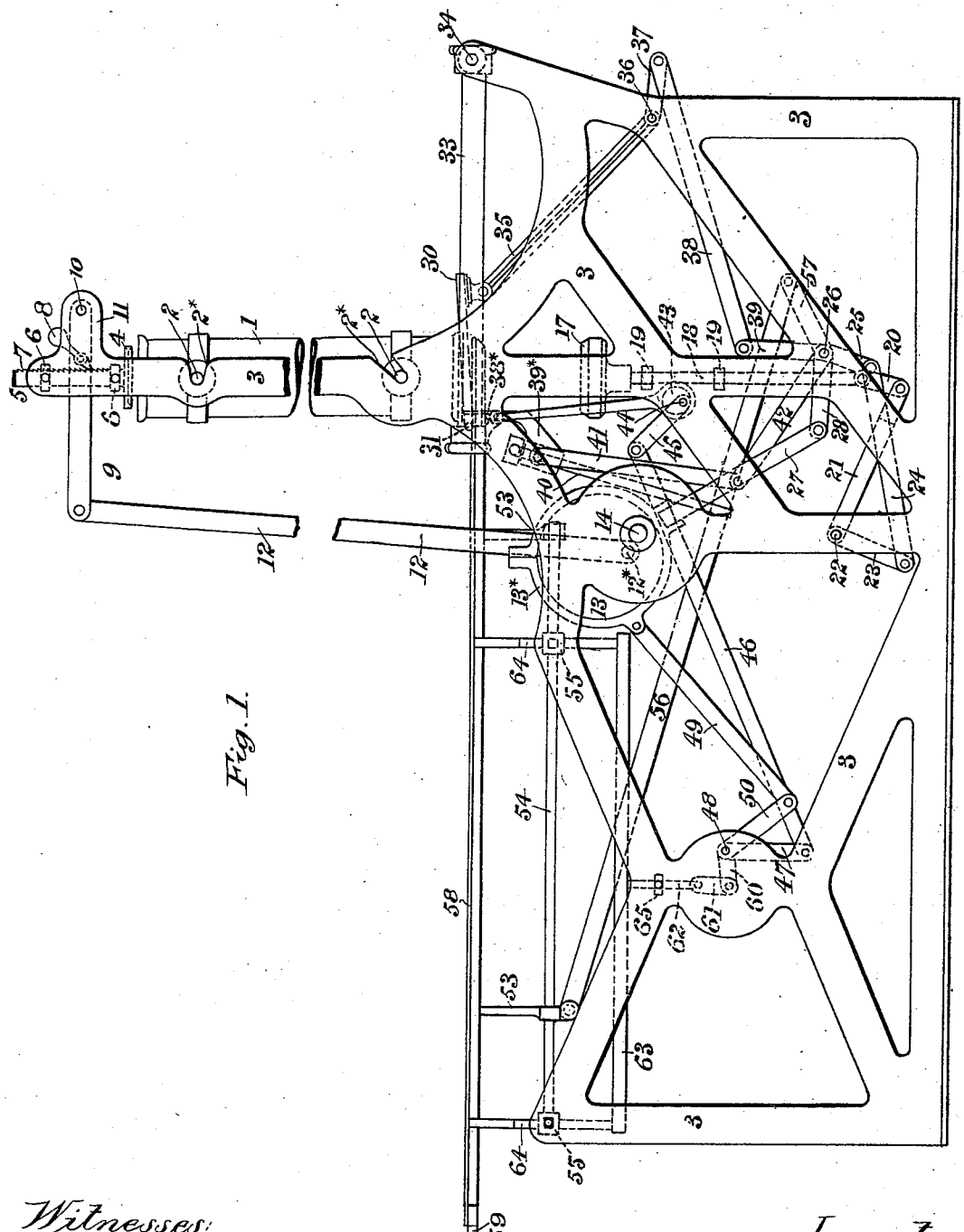

(No Model.) 3 Sheets—Sheet 1.
W. HUCKS, Jr.
APPARATUS FOR MOLDING PATS OR BLOCKS OF BUTTER OR OTHER LIKE PLASTIC MATERIAL.
No. 526,902. Patented Oct. 2, 1894.

Witnesses:
George Baumann
Edith J. Griswold

Inventor
William Hucks Jr.
By his Attorneys
Howson and Howson

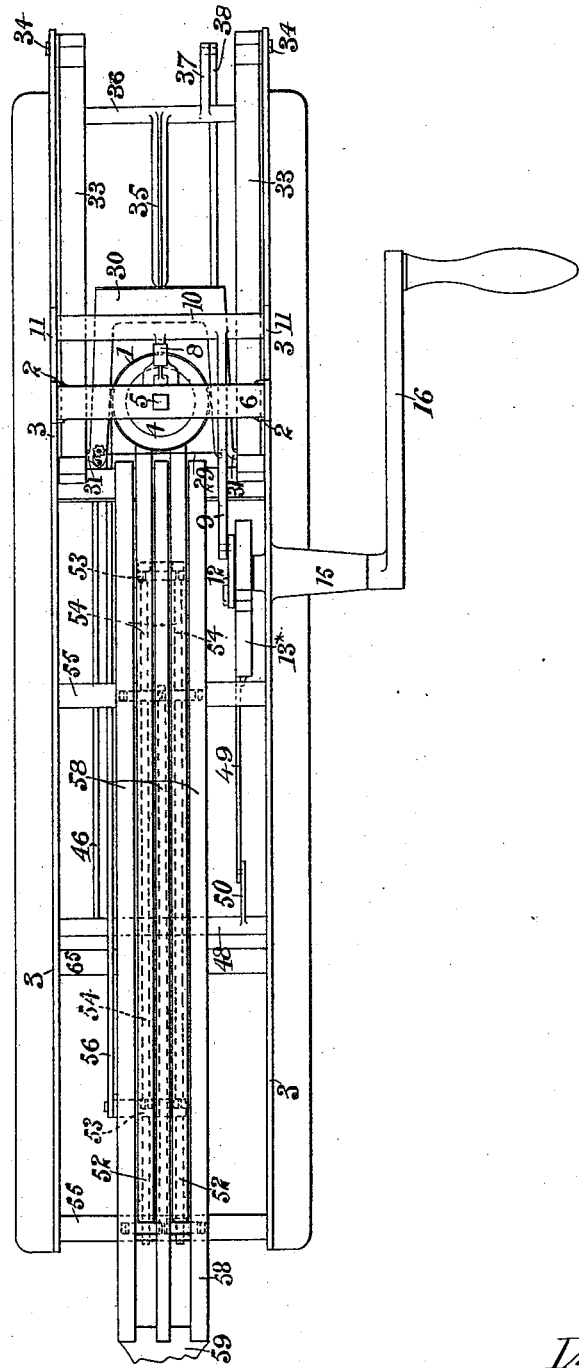

(No Model.) 3 Sheets—Sheet 3.
W. HUCKS, Jr.
APPARATUS FOR MOLDING PATS OR BLOCKS OF BUTTER OR OTHER LIKE PLASTIC MATERIAL.
No. 526,902. Patented Oct. 2, 1894.
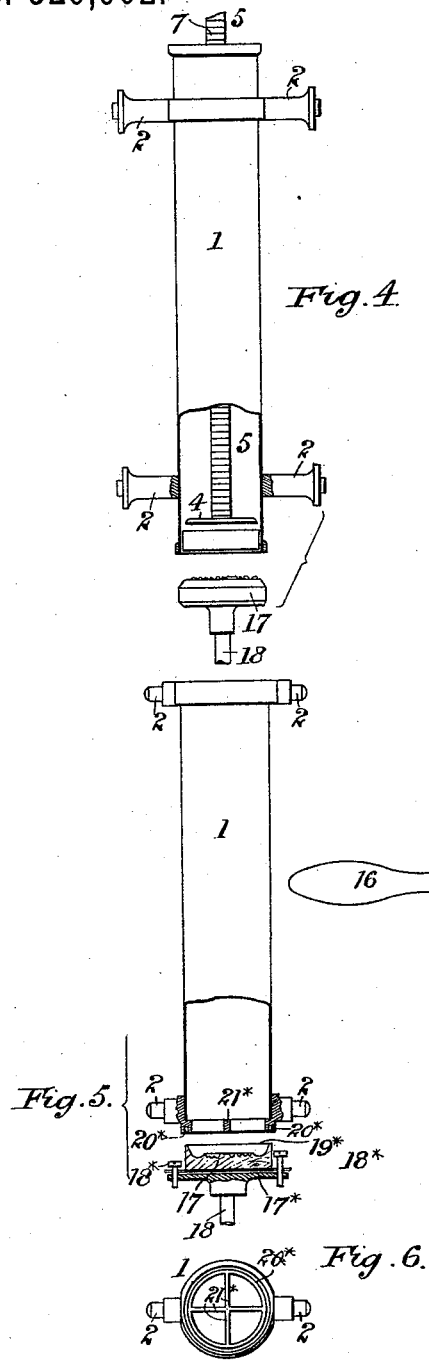
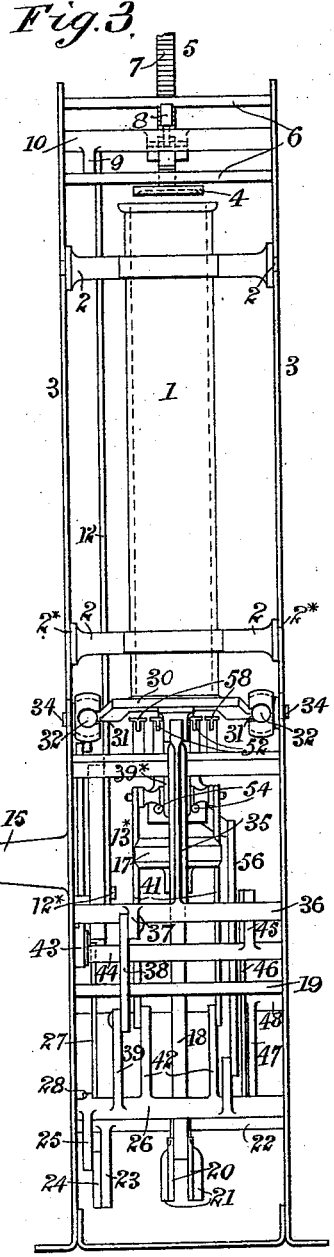
Witnesses
George Baumann
Edith J. Griswold
Inventor
William Hucks, Jr.
By his Attorneys
Howson and Howson

UNITED STATES PATENT OFFICE.

WILLIAM HUCKS, JR., OF LONDON, ENGLAND.

APPARATUS FOR MOLDING PATS OR BLOCKS OF BUTTER OR OTHER LIKE PLASTIC MATERIAL.

SPECIFICATION forming part of Letters Patent No. 526,902, dated October 2, 1894.

Application filed June 13, 1893. Serial No. 477,435. (No model.) Patented in England October 19, 1892, No. 18,749, and in France April 25, 1893, No. 229,608.

*To all whom it may concern:*

Be it known that I, WILLIAM HUCKS, Jr., engineer, a subject of the Queen of Great Britain and Ireland, residing at 22 Oval Road, Camden Town, in the city of London, England, have invented certain Improvements in Apparatus for Molding Pats or Blocks of Butter or other Like Plastic Material, (for which I have obtained Letters Patent in Great Britain, dated October 19, 1892, No. 18,749, and in France April 25, 1893, No. 229,608,) of which the following is a specification.

My invention relates to apparatus for molding pats or blocks of butter or like plastic material of any desired size or thickness and of a circular or other desired form.

The butter or other material (it is for the purposes of description presumed to be butter) to be molded is packed into a molding tube which is then placed in a position in the machine for a plunger or piston to enter one end of the said molding tube and cause the butter to be forced from the opposite end of the tube. This plunger or piston may be operated at intervals by a rack or equivalent means to such an extent as to force the butter to the required distance from the end of the molding tube to form the desired thickness of the pat or block at each intermittent motion of the plunger or piston and means may be provided for varying the extent of movement of the plunger or piston according to the thickness of the pats or blocks required. Before the butter is projected from the molding tube a stamp or die may be caused to move forward and press on the end of the butter in the tube or be brought into position for the butter to enter the die so as to impress or stamp on the end surface of the butter the design on the said stamp or die. The butter having received an impression from the stamp or die the said stamp or die is caused to recede and the butter having by the plunger or piston hereinbefore referred to, been projected from the tube to the desired extent is separated from the main body of the butter in the tube by a knife, wire or equivalent cutting device which is caused to move at right angles to and close to the end of, the molding tube and through the protruding butter. Each pat or block thus severed is received on a table or carrier by which it is moved away from the end of the molding tube so as to permit of the stamp or die again coming into position to stamp as before the fresh surface of the butter exposed, the cutter returning to its former position before the stamp or die comes into operation.

To facilitate the separation of the pats or blocks from the butter in the molding tube it may be found desirable to raise the temperature of the knife, wire or cutting device which may be effected by means of electricity, or by a lamp or otherwise.

The table or carrier on which the pats or blocks fall with their stamped or impressed surfaces downward, may receive a motion each time it receives a pat or block that will transfer the said pat or block onto a removable tray or receiver, the removable tray or receiver and the table or carrier being actuated so that the pats or blocks are received in proper order by the said tray or receiver.

The pats or blocks of butter may be deposited from the removable tray or receiver onto a dish or receptacle with their stamped surfaces uppermost.

In order that my said invention may be fully understood I will more particularly describe the same, and for that purpose shall refer to the several figures on the annexed sheets of drawings, the same numerals of reference indicating corresponding parts in all the figures. I do not however confine myself to the details of construction described and illustrated, as it will be evident that considerable variations may be made therein without departing from the nature of my invention.

Figure 1 represents, in side elevation, an apparatus constructed according to my invention, for molding pats or blocks of butter or like plastic material which, however, I will as aforesaid presume to be butter. Fig. 2 is a plan corresponding to Fig. 1; Fig. 3, an end elevation. Fig. 4 is an elevation, partly in section, of one of the molding tubes detached, together with a die for impressing the butter with a design. Fig. 5 is a sectional elevation of a molding tube or die for stamping or molding designs in relief on the butter, and Fig. 6 is an end view of the tube.

Referring to Figs. 1, 2 and 3, 1 is a molding tube which may be corrugated longitudinally or grooved in the interior to produce on the periphery of the pats or blocks of butter an ornamental appearance or the inside of the tube may be plain and circular or of any other desired form according to the shape of the pats or blocks to be molded. This tube is charged with butter which may be effected by any suitable means, and is then placed in position in the molding machine and is retained in position therein by any suitable means. In the arrangement shown the tube 1 is provided with studs or projections 2 which enter slots 2* in the frame 3. Fitted to slide in the tube 1 is a piston or plunger 4 the rod 5 of which is carried in guides 6 and is provided with rack teeth 7 with which a pawl 8 engages to intermittently depress the piston 4 so as to force the amount of butter required for each pat or block from the lower end of the molding tube 1. The pawl 8 is carried on a lever 9 mounted on a fulcrum pin or bolt 10 in brackets 11 on the frame of the machine. The said brackets 11 and also the lever 9 may be provided with holes arranged at different distances from the pawl 8 so that the position of the fulcrum pin or bolt 10 may be altered as required and the stroke of the piston be thereby varied to cause it to project more or less of the butter from the molding tube according to the thickness of the pats or blocks which it is desired that the machine shall produce.

The lever 9 is connected by a rod 12 and pin 12* to an eccentric 13 fixed on or formed in one with a spindle or shaft 14 carried in a long bearing 15 on the frame 3, and provided with a handle 16, by means of which the spindle and the eccentric may be rotated and impart, through the connections hereinafter described, motion to the various parts of the machine at the proper times. Before the butter is projected from the molding tube by the descent of the piston 4, a die or stamp 17, bearing any required design, is caused to come in contact with and impress the end of the butter contained in the tube 1. This die or stamp is carried on a rod 18 sliding in guides 19 in the frame of the machine. The rod 18 is connected by links 20 to an arm 21 on a rock shaft 22 on which shaft is another arm 23 connected by a link or rod 24 to an arm 25 on another rock shaft 26. To an arm 28 on the rock shaft 26 is connected, by a rod 27, the strap 13$^\times$ of the eccentric 13, so that when the eccentric is rotated a positive motion will be transmitted to the stamp or die 17 through the rock shafts 26 and 22 and the connections hereinbefore described. A positive motion is also transmitted from the rock shaft 26 to the cutting device by which the protruding butter is severed from the body of the butter contained in the molding tube. The cutting device consists of a wire 29 carried in a frame 30 pivoted at 31 to blocks 32 to slide in guides 33 pivoted at 34 to the frame 3 of the machine. The frame 30 is connected to an arm 35 on a rock shaft 36, another arm 37 on the said rock shaft being connected by a rod 38 to an arm 39 on the rock shaft 26, hereinbefore referred to, so that when the shaft is operated by the eccentric 13 the cutter will be caused to move forward and sever the protruding portion of the butter and then retire before the stamp or die comes into position to stamp the next portion of the butter. To prevent the severed pat or block of butter from being carried back by the wire, after it has been separated a lip 38* on a piece 39* fitted to slide on a rod 40 and connected by links 41 to arms 42 on the rock shaft 26 is brought into such position that when the wire has severed the pat the said wire passes over and in contact with the top of the lip 38* insuring the detachment of the pat or block so that it falls onto the carrier. After the protruding portion of butter has been severed by the cutter from the mass contained in the tube, the said cutter is caused to return to its normal position past the end of the molding tube, and in order to prevent the cutter from scraping the end of the tube in its rearward movement, the ends of the guides 33 farthest from their fulcrum 34 descend so as to allow the cutter to clear the end of the molding tube 1. This lowering of the guides 33 (as shown in the drawings) is effected by connecting the forward end of one of the said guides to the rod of an eccentric 43 fast on a rock shaft 44, and arm 45 on this rock shaft being connected by a rod 46 to an arm 47 on another rock shaft 48 which receives a rocking movement from the eccentric 13, the strap 13$^\times$ of the eccentric being connected by a rod 49 to an arm 50 on the rock shaft 48.

Each pat or block of butter as it is severed is received onto a carrier which is brought into position to receive it and then moved away so as to permit of the stamp or die rising to act on the end surface of the butter in the molding tube. This carrier consists of bars 52 (see Fig. 2) attached to transverse brackets 53 carried on rods 54 fitted to slide in holes in transverse bars 55 attached to the frame 3. One of the brackets 53 is connected by a rod 56 to an arm 57 on the rock shaft 26 so that when this rock shaft is rocked in its bearings a longitudinal motion is given to the carrier 52. The removable tray 58 consists of longitudinal bars connected together at one end by a handle at 59, the opposite end being disconnected. The bars of the carrier 52 are situated between the bars of the tray 58. The bars of the said tray 58 receive an up and down motion whereby the pats or blocks of butter are lifted from the carrier 52 and deposited thereonto at a distance equal to the diameter of one pat farther from the molding tube at each intermittent motion until the removable tray is charged with pats or blocks of butter. The up and down motions of the tray are transmitted from the rock shaft 48 which is actuated from the eccentric 13 by the rod 49, as hereinbefore described, the said rock shaft having an arm 60 thereon connected by a link 61 to a rod 62 depending from a frame 63 upon which the tray 58 is supported. The frame 63 is guided in its up and down motion by the rod 62 passing through guides 65 in the frame of the machine and the rods 64 sliding in holes in the transverse bars 55. At the moment when the carrier 52 is in position under the end of the molding tube and has just received a severed pat the surface of the tray 58 in its downward movement reaches a point just below the level of the carrier 52. The said carrier then commences to move forward from under the end of the molding tube 1 bringing with it the severed pat of butter. At the completion of this forward stroke of the carrier 52 the surface of the tray 58 has reached in its upward movement, a point just above the level of the carrier 52 lifting the pat of butter from off the said carrier allowing the carrier 52 to return to the end of the molding tube 1 in readiness to receive the next pat of butter. A pat is severed from the end of the molding tube 1, drops onto the carrier 52 and at the same time the tray 58 descends and reaches a point below the level of the carrier 52 as hereinbefore described and leaves the previously severed pat on the carrier 52 which moves from under the end of the molding tube 1 bringing with it the two pats. At the end of this forward stroke the two pats are lifted by the tray 58 as hereinbefore described, to permit of the carrier 52 returning and receiving another pat of butter and subsequently bringing the three pats forward and the rising and falling action of the tray 58 continuing, the pats advance step by step until the tray 58 is charged with the desired quantity of pats or with as many as it is constructed to hold.

The tray 58 may be removed from the machine and the pats of butter be discharged therefrom with their stamped sides uppermost onto a dish or other receptacle. When the whole of the butter is expelled from the molding tube it (the molding tube) is removed from the machine and replaced by a tube charged with butter. I prefer to use a piston or plunger 4 detached from the rod 7 so that when the whole of the butter is removed from the molding tube, the rod 7 may be withdrawn leaving the plunger 4 in the tube which tube may be removed from the machine and recharged with butter and then replaced in the machine with the end containing the plunger uppermost for the rod 7 to act upon.

The molding tube is supported in the frame 3 by studs or trunnions 2 as hereinbefore described, which studs are arranged at equal distances from the ends of the tube so that the said tube may be placed in position with either end uppermost. This arrangement obviates the necessity for withdrawing the piston or plunger 4 from the tube after the butter has been expelled therefrom and prevents any butter which may remain on the inner surface of the tube from being carried by the plunger to outside the tube.

When designs in relief are required to be stamped on the pats of butter it is necessary in order to relieve the die or stamp without disfiguring or destroying the design on the butter to provide means whereby the air may be allowed to enter the die or stamp rapidly and in order to effect this I connect the die proper 17 to a plate or holder $17^\times$ by two screws or pins $18^\times$ arranged on diametrically opposite sides of the die. On these pins, lugs attached to the die 17 are free to slide. The head of one of these screws or pins projects to a greater distance above the plate $17^\times$ than does that of the other pin or screw, so that when the plate $17^\times$ is moved in a direction away from the tube the shorter of the two screws or pins in the said plate $17^\times$ will come into contact with one of the lugs attached to the die and cause the said die to tilt to some extent sidewise so as to allow of the free entrance of air to it as it is being withdrawn from the butter. The edge $19^\times$ of the die or stamp when in position to receive the butter from the molding tube enters an annular recess $20^\times$ in the end of the said molding tube which admits of the capacity of the die or stamp being varied. Across the end of the molding tube are provided bars $21^\times$ which cause the butter to issue in a divided condition from the tube into the die or stamp 17 and provide for the escape of air from the die or stamp when being charged with butter.

If desired, the stamp or die may be wetted after the formation of every pat for instance by lowering it into water at each stroke or by any other suitable means.

I claim as my invention—

1. In apparatus for making pats of butter or the like, the combination of a molding tube and means for separating pats of butter therefrom, with a carrier for the pats and a removable tray, and means for operating the carrier so as to cause it to come into position to receive the pats as they are separated from the molding tube and transfer them in progressive order onto the removable tray, substantially as hereinbefore described.

2. In apparatus for making pats of butter or the like a reversible molding cylinder tube and piston or plunger adapted to remain in the tube and be acted upon from either end of the tube, with an operating rod adapted to be detached from said piston or plunger, substantially as and for the purpose described.

3. An apparatus for making pats of butter or the like having a die, stamp or mold, a reciprocating support for the die, and means for tilting the die when it is removed from the butter, substantially as hereinbefore described.

4. In apparatus for making pats of butter or the like, a die, stamp or mold, a reciprocating support for the die, and means for tilting the die when it is removed from the butter, in combination with bars in the delivery end of the molding tube, substantially as hereinbefore described.

5. In an apparatus for making pats of butter or the like, the combination of a cylinder or tube for containing the butter or the like, and a plunger to protrude a portion of the butter from the end of the tube, with a deivce for separating the portion so protruded, means for imparting forward and backward motions to the said separating device, and means for lowering the same out of the way of the butter during its backward motion, all substantially as and for the purposes set forth.

In testimony whereof I have signed my name to this specification in the presence of two subscribing witnesses.

WILLIAM HUCKS, JR.

Witnesses:
CHAS. MILLS,
WILLIAM F. UPTON,
*Both of 47 Lincoln's Inn Fields, London, W.C.*